United States Patent [19]

Schaible

[11] 4,143,353
[45] Mar. 6, 1979

[54] APPARATUS FOR THE SUPERVISION OR CORRECTION OF ELECTRICAL SIGNALS

[75] Inventor: Wolfgang Schaible, Würenlingen, Switzerland

[73] Assignee: BBC Brown, Boveri & Company Limited, Baden, Switzerland

[21] Appl. No.: 808,406

[22] Filed: Jun. 20, 1977

[30] Foreign Application Priority Data

Jul. 7, 1976 [CH] Switzerland .................. 8685/76

[51] Int. Cl.² .............................................. G06F 11/08
[52] U.S. Cl. ........................ 340/146.1 BE; 307/357; 328/116
[58] Field of Search ............. 340/146.1 BE; 318/564; 307/356, 357; 328/116, 117, 154

[56] References Cited

U.S. PATENT DOCUMENTS

| | | | |
|---|---|---|---|
| 3,544,778 | 12/1970 | Masters, Jr. ............. | 340/146.1 BE |
| 3,670,148 | 6/1972 | Moses ........................ | 340/146.1 BE |
| 3,686,493 | 8/1972 | Schmid ...................... | 340/146.1 BE |
| 3,689,802 | 9/1972 | Waldmann ................. | 340/146.1 BE |
| 3,697,776 | 10/1972 | Matejka ..................... | 328/117 |
| 3,979,720 | 9/1976 | Laas et al. ................. | 340/146.1 BE |

*Primary Examiner*—Charles E. Atkinson
*Attorney, Agent, or Firm*—Werner W. Kleeman

[57] ABSTRACT

A signal supervision or correction apparatus including a plurality of signal channels which carry signals comparable to one another and are connected with a mean value-forming circuit. The mean value-forming circuit has its output connected with an input of a signal storage circuit. The output of the signal storage circuit is connected, together with at least one signal channel that carries a signal to be supervised, to a comparison circuit in which there is formed, as the supervision criterion, the difference between at least one signal to be supervised and the stored mean value signal.

8 Claims, 2 Drawing Figures

APPARATUS FOR THE SUPERVISION OR CORRECTION OF ELECTRICAL SIGNALS

BACKGROUND OF THE INVENTION

The present invention relates to an improved apparatus for the supervision or correction of electrical signals, the apparatus including a plurality of signal channels which carry signals comparable to one another and which are connected by way of a mean value-forming means or circuit to an evaluation or correcting circuit. Apparatus of this kind is generally referred to by the designation "mean value-forming redundancy circuit."

When for example a plurality of input signals are to be supervised by means of an apparatus of this kind, a mean value signal is formed from the input signals and each input signal is compared with this mean value signal. Too great a difference between an input signal and the mean value signal is taken as denoting that the input signal concerned is faulty and brings about its exclusion from the process of mean value formation. Here the decisive factor for determining a fault is the comparatively smaller error component within the mean value signal.

It is a disadvantage of this known apparatus that an abrupt alteration of an input signal brought about by a fault, initially appears — disregarding the attenuation brought about by mean value formation — in the mean value signal passed on for further processing, until the fault is recognized by comparison of the respective input signal with the mean value signal and the faulty input signal is disconnected. A further disadvantage consists in that a fault which may occur in another input signal still further weakens the difference criterion relevant for the fault and, in a system with three input signals, the fault detection becomes impossible.

SUMMARY OF THE INVENTION

A primary object of the present invention is to provide an apparatus for supervising and/or correcting signals, which provides reliable fault detection and in which the fault detection operation is largely independent of the number of faulty input signals included in the mean value signal.

According to the present invention there is provided signal supervision or correction apparatus including a plurality of signal channels which carry signals comparable to one another and are connected by way of a mean value-forming circuit to an evaluation or correcting circuit, wherein the mean value-forming circuit and a signal storage circuit are connected in series and the output of the signal storage circuit is connected, together with at least one signal channel that carries a signal to be supervised, to a comparison circuit in which there is formed, as the supervision criterion, the difference between at least one signal to be supervised and the stored mean value signal.

In an apparatus according to the invention, because of the storage of the mean value signal, after the appearance of the fault, for a time interval that is limited, but which in general however can be readily determined to be of adequate duration, the unaltered or only slightly altered mean value signal is available as a reference value for fault detection. The fault — arising in general as a result of the failure of a component or circuit — will usually occur abruptly, but will in any case occur at a rate of change higher than that of the changes in the work signal, such fault can therefore be determined with great certainty, and in principle even in the case of the simultaneous dropout or fault occurrence in more than one of the signals being supervised.

A particularly simple and convenient circuit arrangement is obtained if, in accordance with a further embodiment of the invention, the signal storage circuit includes a follow-up control circuit comprising at least one integrating element, with the output signal of the mean value-forming circuit as the reference input value and the output signal of the storage circuit as the controlled value. This stored output is applied to the comparison circuit together with at least one of the signals to be supervised. Additionally, it is advantageous to connect to the reference input of the follow-up control circuit a feedback loop of the follow-up control circuit, of opposite polarity to the output of the mean value-forming circuit. In this manner it advantageously becomes possible to supervise the mean value-forming circuit itself against the occurrence of faults, by connecting the output of the mean value-forming circuit and the output of the signal storage circuit to a comparison circuit. When the supervised signals are fault-free, that is, do not alter abruptly, an abrupt and thus error-indicative alteration of the mean value signal is compared with the initially unchanged, stored mean value signal and a fault is thus detected.

BRIEF DESCRIPTION OF THE DRAWINGS

The invention will be better understood and objects other than those set forth above, will become apparent when consideration is given to the following detailed description thereof. Such description makes reference to the annexed drawings wherein.

DETAILED DESCRIPTION OF THE PREFERRED EMBODIMENTS

Figure 1:
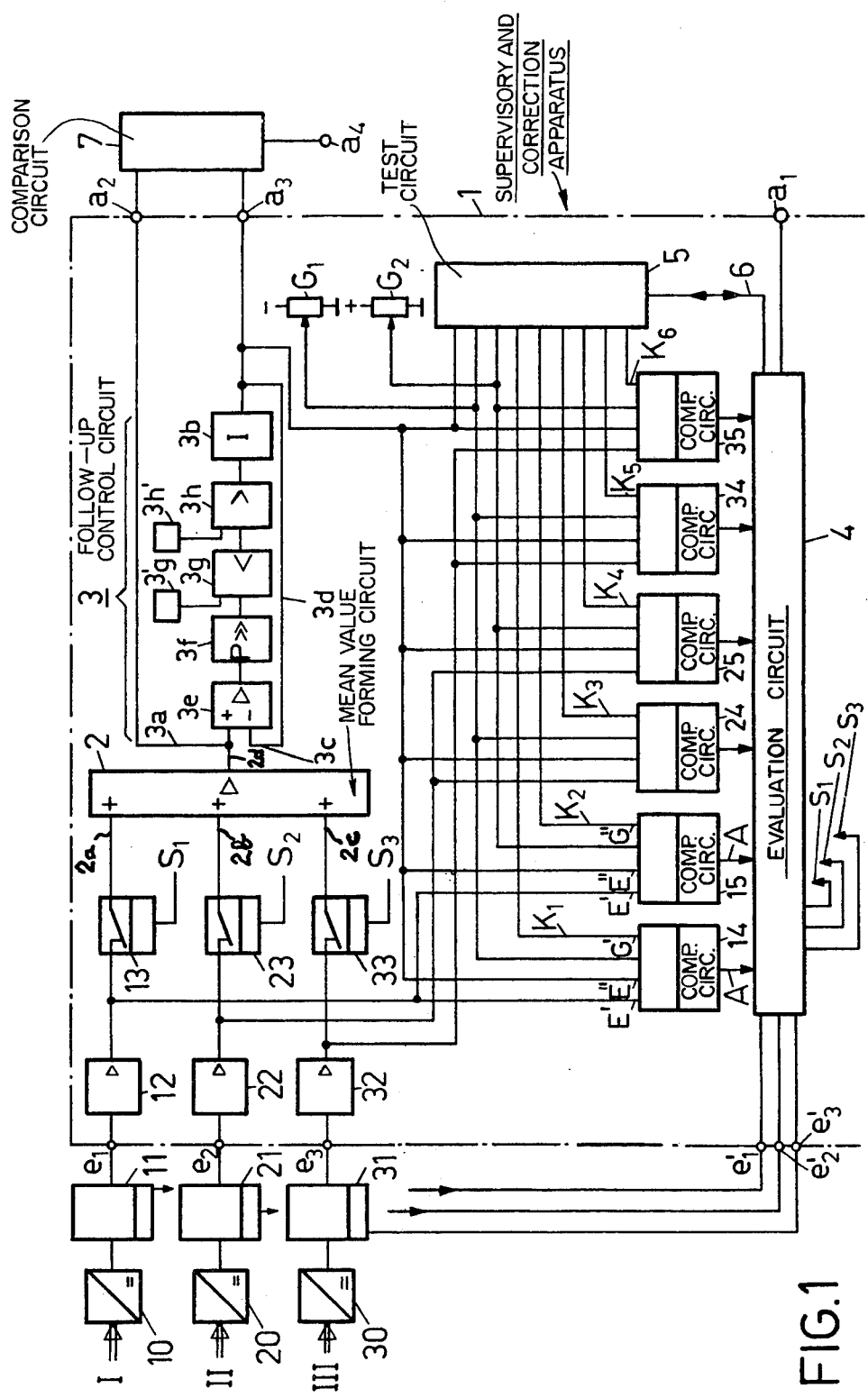
FIG. 1 is a basic circuit diagram of a supervisory and correction apparatus constructed in accordance with the present invention.

Referring now to the drawings, the supervisory and correction apparatus 1 represented in FIG. 1 receives signals to be supervised over three signal channels I, II, III. Each of the received signals is fed by way of a respective signal converter 10, 20, 30 to a respective signal distributor 11, 21 31. Each signal distributor 11, 21, 31 feeds a signal input, $e_1$, $e_2$, $e_3$ respectively, and a control input $e_1'$, $e_2'$, $e_3'$ respectively, of the apparatus 1.

Within the apparatus 1 each input signal is fed by way of an amplifier 12, 22, 32 and a normally closed disconnecting or cut-off switch 13, 23, 33 to a respective input 2a, 2b, 2c of a mean value-forming circuit 2, the output 2d of which is fed by way of a terminal $a_2$ for further use and is also applied to the reference value input $3_a$ of a follow-up control circuit 3. This follow-up control circuit 3 forms the signal storage circuit and for this purpose comprises an integrator or integrating element 3b, which feeds an output $a_3$ with the stored mean value signal as well as applying a signal by way of a feedback loop 3d to a positioning value input 3c of a difference or differential amplifier 3e having the mean value signal applied to its reference value input 3a, the feedback signal being of opposite polarity to the control or regulation deviation.

From the output $a_3$ the stored mean value signal may be taken, instead of the mutually similarly significant input signals, for a further use which is of no further interest at this point. It is here assumed that, on the one hand, changes in the input signals occasioned by faults will take place substantially more rapidly than the fastest changes in the work signals (adequate frequency separation between the upper limit of the useful spectrum and the lower limit of the disturbance spectrum) and, on the other hand, that the signal delay resulting from storage in the follow-up control circuit 3 is dimensioned to be such that, while there is available an adequately long storage in comparison to the signal changes occasioned by a fault, there is no impermissible temporal distortion, i.e., a distortion as a function of time of the work signal components.

In addition there is provided for each signal input $e_1$, $e_2$, $e_3$ a pair of comparison circuits 14, 15; 24, 25 and 34, 35 respectively, each of which includes two comparison inputs E' and E" and a threshold or limiting value input G' or G" respectively, and also an indicator output A. For the sake of clarity these connections to the comparison circuits are designated only for the units 14 and 15. The arrangement is such that each of the comparison circuits 14, 24, 34 has a limiting value input G' and each of the comparison circuits 15, 25, 35 has a limiting value input G". The limiting value inputs G' are fed in common with a voltage of one polarity from a lower limiting value setter $G_1$ and the limiting value inputs G" are fed with a voltage of the opposite polarity from an upper limiting value setter $G_2$. The comparison input E' in each case is connected to the output of the amplifier 12, 22, 32, respectively, arranged in the respective signal channel, while the comparison inputs E" are connected in common to the output $a_3$ of the mean value-signal store or storage 3. In this manner the outputs A of the comparison circuits 14, 15; 24, 25 and 34, 35 each provide an indicator signal if the difference between the respective input signal and the stored mean value signal falls below the lower limiting value provided by limiting value setter $G_1$ or exceeds the upper limiting value provided by limiting value setter $G_2$. The circuitry of the comparison circuits necessary for this function is in itself of known kind and does not require further explanation. It is further understood that in some cases instead of comparison with two limiting values of opposite polarity, a comparison of the absolute value of the difference with only one limiting value may be effected.

The outputs A of the comparison circuits are connected to an evaluation circuit 4 which, by means of conventional logic circuit means deliver at outputs $S_1$, $S_2$, $S_3$ control signals for the disconnecting or cut-off switches 13, 23, and 33 respectively and thus open a disconnecting switch of the respective signal channel if the difference between the respective input signal and the mean value signal falls below the lower limiting value or rises above the upper limiting value.

The appropriate channel is thus disconnected from the mean value-forming circuit 2 and thus prevented from having a falsifying effect upon the signal to be used further, without this resulting even in a transient noticeable error in this signal. This manner of operation remains basically the same even if further signal channels drop out, provided that at least one signal channel at the input side remains intact. If a predetermined number of functioning signal channels is not maintained, then an emergency shut-down operation or some similar action may obviously be initiated.

For the further evaluation of defects that occur, the signal channels I, II and III are connected by way of respective outputs of the signal distributors 11, 21, 31 to appropriate inputs $e_1'$, $e_2'$ and $e_3'$ of the evaluation circuit 4. An output $a_1$ of the evaluation circuit 4 may — in addition to the channel disconnection already explained — effect defect warnings of various kinds by way of the outputs $S_1$, $S_2$ and $S_3$.

For supervision of the comparison circuits themselves as well as the limiting value setters, a test circuit 5 is provided, which has a test circuit output $K_1$–$K_6$ for each of the comparison circuits. Each of these outputs $K_1$–$K_6$ provides a test signal applicable additively to a difference signal for supervising the limits, formed from a signal to be supervised and from the stored mean value signal. By applying an artificial error signal in this manner it is possible to test the operation of the comparison circuits including supervision of limits as well as that of the evaluation circuit. By way of a channel 6 information as to the results of these tests and commands for readjustment of the evaluation circuitry 4 may be exchanged between the test circuit 5 and the evaluation circuit 4. Multi-stage supervision and a correspondingly high level of reliability may thus be achieved.

An input side of the signal storage circuit 3 already mentioned is connected in the manner shown in FIG. 1 to the output $2d$ of the mean value-forming circuit 2, both the positioning value input $3c$ and the reference value input $3a$ being separately accessible. As a result, the mean value signal at output $a_2$ may be checked in a subsequent comparison circuit 7 against the stored mean value signal at output $a_3$ as a reference value. If now, for example, with fault-free signal channels I, II, III the mean value-forming circuit 2 fails, then there appears at the output $a_4$ of the comparison circuit 7 a corresponding selective error or disturbance signal. Without this comparison with the stored, quasi-constant mean value signal, selective supervision of the mean value-forming circuit 2 would not be unconditionally possible, since comparison of the input signals with the undelayed mean value signal does not allow any conclusion to be formed as to whether a detected fault is in the inputs or in the mean value-forming circuit.

The follow-up control circuit 3 comprises, in addition to a required reference value-actual value comparator $3e$ with the inputs $3a$ and $3c$ already discussed a proportional amplifier $3f$ with two following limiter switches $3g$ and $3h$ as well as the respective limit setters $3'g$ and $3'h$. These limit switches impart to the storage circuit 3 a non-linear or discontinuous characteristic, such that the ratio between the absolute value of the control rate and the absolute value of the control deviation, is greater when the control deviation lies below or above predetermined negative and positive limiting values than when it lies between these limiting values. This influence exerted on the control behaviour is produced by an alteration of the ratio between the proportional and the integrating components of the transfer function determined by the circuit configuration. In the illustrated embodiment the proportional component is altered, but in principle a corresponding alteration of the integrating component could alternatively be employed for the same purpose. In any case, there is achieved the result that — in contrast to the case of a constant transmission function — the control deviation is not inversely exponential, that is asymptotic, but until it attains the next-encountered limiting value it first diminishes approximately linearly and only then runs through a very short asymptotic section of the time transfer function. The total time interval necessary for compensating a jump (disturbance signal) in the reference input or controlled value is thus substantially shortened, without adversely affecting the time relations and thus the storage capability of the follow-up control circuit in the initial phase of the control process utilized for the present purposes of supervison.

Figure 2:
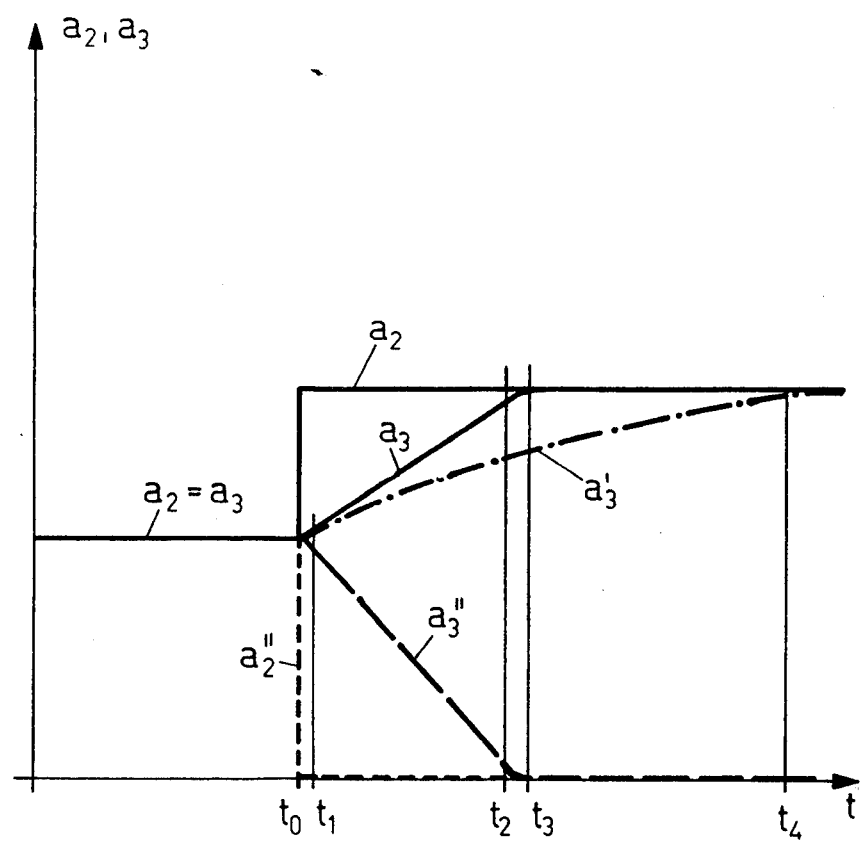
FIG. 2 is a timing diagram representing the transfer response (step response) of the follow-up control circuit in the apparatus of FIG. 1.

In FIG. 2 the responses are schematically represented in a time diagram of the reference input value $a_2$ and the controlled value $a_3$ at the output of the storage circuit (for the sake of simplicity the designations of these signals are taken as being the same as those of the corresponding circuit outputs) on the assumption of a jump in the reference input signal.

Before time $t_0$, the instant of the jump in reference valve input $a_2$, the circuit is in a balanced condition in which $a_2 = a_3$. After time $t_0$, $a_3$ increases until time $t_2$ in accordance with the positive jump in $a_2$, namely at an at least approximately constant rate. This corresponds to a wholly or predominantly integrating characteristic of the control circuit. When, at time $t_2$, a small residual value of the control deviation $a_2-a_3$ is attained, the P-component comes more strongly into action, owing to the switchover or non-linear alteration of the transmission function already mentioned, so that $a_3$ attains the value $a_2$ in the short remaining interval from $t_2$ to $t_3$ and the control deviation practically vanishes. At time $t_3$ the control circuit is thus already balanced again. Without modification of the control circuit behaviour this would only occur substantially later, about at the time $t_4$, as is indicated by the chain-dotted trace of curve $a_3'$.

At the same time, no increase in the rate of change of $a_3$ in the initial phase of the control process following the time $t_0$ is occasioned by this reduction in the inertia of the control circuit. The storage capability of the follow-up control circuit thus remains unaltered in the initial interval used for the present signal supervisory purposes — for the conditions according to FIG. 2 approximately from $t_0$ to $t_1$. From this representation it is also to be seen that $a_3$ alters only very little in the last-mentioned interval, that is, it may be considered as being quasi-constant.

In FIG. 2 there is also shown in broken line a negative jump $a_2''$ corresponding to a fault arising from a failure of the mean value-forming circuit 2. It is apparent that in the interval $t_0$ to $t_1$, that is, in the initial phase of the linear fall of $a_3''$, practically the full value of $a_3$ from the state prior to $t_0$ is available as a reference value for signal comparison, in this case for forming the difference $a_3-a_2 = 0$. The mean value-forming circuit 2 may thus itself be supervised. In the same way, the reference value of $a_3$ derived from the condition prior to $t_0$ is also available for the supervision of the input signals themselves.

A characteristic value indicative of the differences in behaviour of the follow-up control circuit in the different ranges of the control deviation is the ratio between the rate of control, i.e., the follow-up rate of the storage element, and the absolute value of the control deviation. For the present purposes this ratio is greater in the range of larger control deviations than within the predetermined region of a residual control deviation. In addition said ratio may, in the first case be made to be at least approximately constant, i.e. independent of the changing control deviation.

While there are shown and described present preferred embodiments of the invention, it is to be distinctly understood that the invention is not limited thereto, but may be otherwise variously embodied and practiced within the scope of the following claims. Accordingly,

What I claim is:

1. A signal supervision or correction apparatus, comprising:
    a plurality of signal channels which carry signals comparable to one another;
    a mean value-forming circuit having an input side and an output side and receiving at its input side the signals carried by the plurality of signal channels;
    a signal storage circuit having an input and an output and serving to store and deliver a stored mean value signal;
    said mean value-forming circuit having its output side connected with the input of said signal storage circuit;
    at least one comparison circuit;
    the output of the signal storage circuit being connected, together with at least one signal channel which carries a signal to be supervised, to said comparison circuit in which there is formed, as the supervision criterion, the difference between at least one signal to be supervised and the stored mean value signal.

2. The apparatus as defined in claim 1, wherein:
    said signal storage circuit comprises a follow-up control circuit including at least an integrating component;
    the output side of said mean value-forming circuit supplying its output signal as reference input value to said signal storage circuit; and
    means for supplying the output signal of the signal storage circuit as controlled value to said follow-up control circuit.

3. The apparatus as defined in claim 2, wherein:
    the follow-up control circuit includes a feedback loop connected, in inverse polarity to the output of the mean value-forming circuit, to a positioning value input of the follow-up control circuit.

4. The apparatus as defined in claim 3, further including:
    an additional comparison circuit;
    the output of the mean value-forming circuit and the output of the signal storage circuit being connected to said additional comparison circuit.

5. The apparatus as defined in claim 2, wherein:
    said follow-up control circuit contains means providing a transmission function including a proportional component and an integrating component and is provided with a non-linear or discontinuously operating control characteristic that alters the relation between the proportional component and the integrating component below and above respective predetermined negative and positive limiting values of the control deviation, in the direction of a higher control corresponding to such absolute values of the control deviation, in comparison with that for control deviations in the range between said limiting values.

6. The apparatus as defined in claim 1, further including:
    means for applying limiting values to said comparison circuit;
    each of said plurality of signal channels defining a supervised input signal channel, each of which is connected together with the output of the signal storage circuit to said comparison circuit.

7. The apparatus as defined in claim 6, further including:
a respective disconnecting switch provided at least in one of the signal channels to be supervised and connected with said comparison circuit for actuation whenever the difference between the signal to be supervised and the stored mean value signal falls below or exceeds a respective predetermined negative or positive limiting value of said difference.

8. The apparatus as defined in claim 6, further including:
a test circuit including an output for each comparison circuit, each said output carrying a test signal which can be superimposed upon a differnce signal formed from one of the signals to be supervised and the stored mean value signal to supervise the limiting values of said difference so as to test the signal supervision or correction apparatus.

* * * * *